United States Patent [19]

Reichardt

[11] 4,398,607
[45] Aug. 16, 1983

[54] AUGER WITH ADJUSTABLE WEAR PLATE
[75] Inventor: Dennis D. Reichardt, Corning, Iowa
[73] Assignee: Roscoe Brown Corporation, Lenox, Iowa
[21] Appl. No.: 271,252
[22] Filed: Jun. 8, 1981
[51] Int. Cl.³ .................. B65G 33/00; A01B 33/10; F02F 9/28
[52] U.S. Cl. .................. 172/119; 172/33; 172/532; 198/676; 403/349
[58] Field of Search .............. 172/532, 119, 33, 744, 172/737, 734, 736, 753, 550; 403/108, 349, 348; 198/676, 677, 664; 248/272, 260, 354 P

[56]       References Cited
     U.S. PATENT DOCUMENTS

| | | | |
|---|---|---|---|
| 303,012 | 8/1884 | Horton | 403/349 X |
| 602,191 | 4/1898 | Lucchesi | 128/57 |
| 1,270,637 | 6/1918 | McQueney | 248/272 |
| 1,318,591 | 10/1919 | Radlein | 308/37 |
| 2,307,386 | 1/1943 | Braxton | 403/349 X |
| 3,362,092 | 1/1968 | Speicher | 172/103 |
| 3,762,537 | 10/1973 | Lutz | 172/532 |

FOREIGN PATENT DOCUMENTS 949638   2/1949   France ................ 242/354 P

Primary Examiner—Richard J. Johnson
Attorney, Agent, or Firm—Zarley, McKee, Thomte, Voorhees & Sease

[57] ABSTRACT

The present invention comprises an adjustable wear plate which is attached adjacent the outer peripheral edge of an auger flighting. The plate includes an outer circumferential edge and an inner circumferential edge. A pair of slots extend inwardly from the inner circumferential edge, and each of these slots is provided with a plurality of notches for receiving a bolt therein. Bolts extend through the flighting of the auger and engage the notches in the slots of the adjustable wear plates. The wear plates may be adjusted by loosening the bolts and fitting them into different notches within the slots.

1 Claim, 7 Drawing Figures

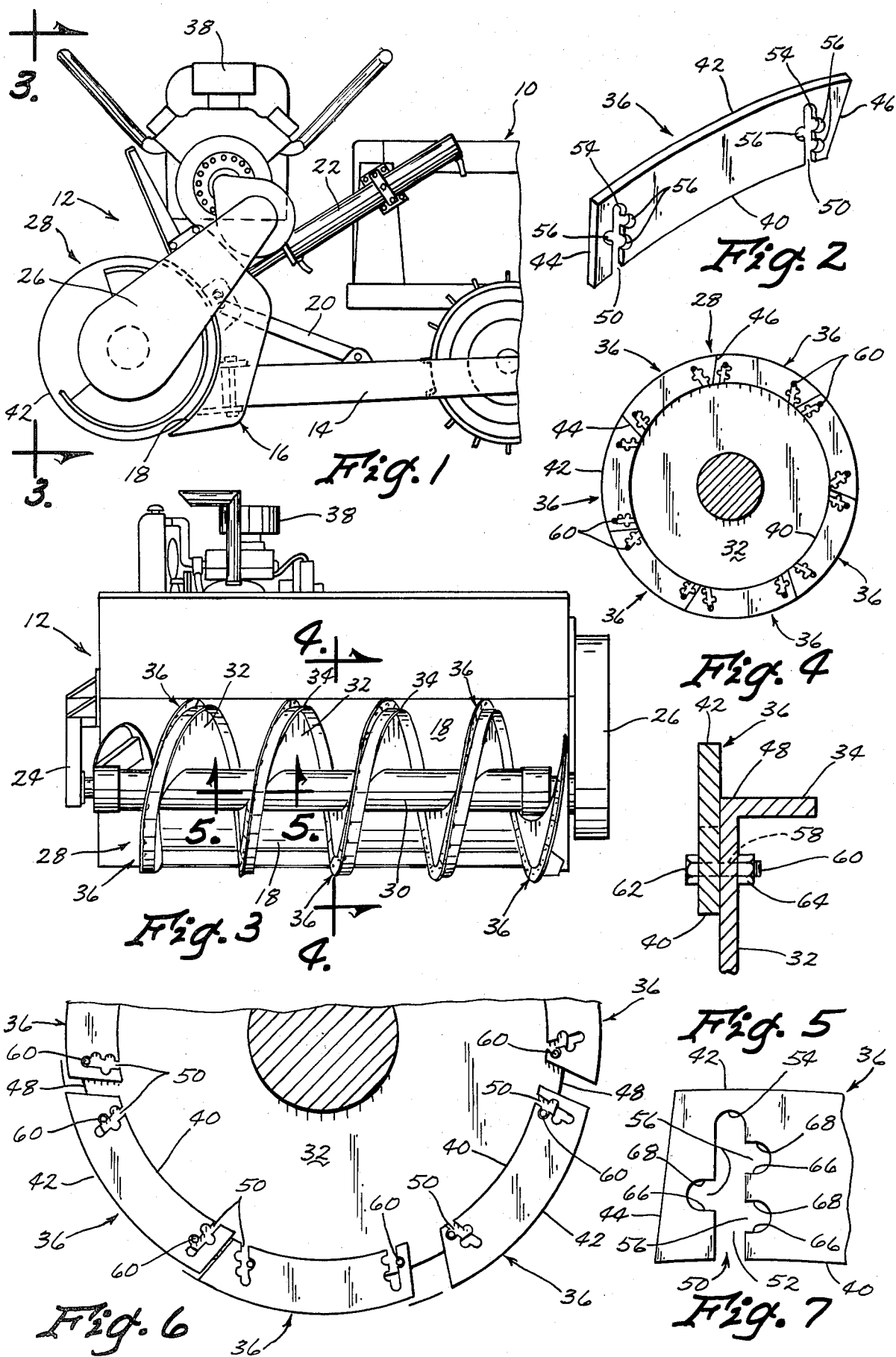

AUGER WITH ADJUSTABLE WEAR PLATE

BACKGROUND OF THE INVENTION

This invention relates to augers and particularly to augers used for backfilling trenches and the like.

Such augers become worn after extensive use by virtue of their frictional engagement with soil, gravel, rocks, etc. during the backfilling operation. In order to protect the auger flightings from such wearing, adjustable wear plates are fastened adjacent the outer peripheral edge of the flighting. An example of such wear plates is shown in prior U.S. Pat. No. 3,362,092.

These prior wear plates include slots in their inner edges for receiving a bolt which extends through a hole adjacent the outer peripheral edge of the flighting. The bolt is tightened in the slot to hold the wear plate against movement. When the wear plate becomes worn, the bolts are loosened and the wear plate is moved radially outwardly, with the bolts riding in the slots.

One disadvantage which has been encountered with the type of wear plate shown in U.S. Pat. No. 3,362,092, is the difficulty in holding the wear plates against movement during operation of the auger. The bolts hold the plates against some frictional movement, but the forces encountered by the wear plates are so great that the wear plates are likely to move even though they are being held by the bolts. The bolts slide in the slots in response to encountering these great forces.

In prior devices, in order to prevent this movement, it was necessary to provide additional means for engaging the inner edges of the wear plates to hold them against movement in an inward radial direction. Usually this blocking means has been provided by bolting a plate to the flighting adjacent the inner peripheral edge of the wear plate. This blocking plate engages the inner peripheral edge of the wear plate and provides further reinforcement to prevent the inward radial movement of the wear plate.

The disadvantage of providing these inner blocking means is that the adjustment of the wear plates is more time consuming and additional holes must be provided in the flighting of the auger.

Therefore, a primary object of the present invention is the provision of an improved auger having adjustable wear plates on the outer peripheral edges of its flighting.

A further object of the present invention is the provision of a wear plate for the auger which can be rigidly held against movement by a pair of bolts, one located each end of the wear plate.

A further object of the present invention is the provision of an improved wear plate which can be held against inner radial movement without the need of blocking plates such as used in prior art devices.

A further object of the present invention is the provision of a wear plate which can be adjusted radially inwardly and outwardly more quickly than prior devices.

A further object of the present invention is the provision of a device which is simpler in construction and which resists to a better degree the forces which are encountered by the outer peripheral edges of the wear plates.

A further object of the present invention is the provision of a device which is economical to manufacture, durable in use and efficient in operation.

SUMMARY OF THE INVENTION

The present invention utilizes a wear plate having slots extending inwardly from its inner peripheral edge. These slots have a plurality of spaced apart notches formed in their inner margins. The bolts extending through the flighting can engage any one of these notches to hold the wear plate against further movement. Because the notches each include a radially outwardly presented surface and a radially inwardly presented surface, they engage the bolts to prevent the wear plates from moving radially inwardly or outwardly in response to the tremendous forces which are encountered by the wear plate.

The notches in the slots eliminate the requirement for further blocking means located radially inwardly from the wear plate. Therefore, the adjustment of the wear plates is a simpler matter than in prior art devices. The wear plates may be adjusted merely by loosening a bolt located at each end of each wear plate. The plate is then moved radially inwardly or outwardly until the bolt rests in the desired notch within the slot in the wear plate. The bolt is then tightened down and the plate is ready for operation.

BRIEF DESCRIPTION OF THE DRAWINGS

FIG. 1 is a partial side elevational view showing a backfilling machine having an auger which utilizes the wear plates of the present invention.

FIG. 2 is a perspective view of the wear plates of the present invention.

FIG. 3 is a sectional view taken along line 3—3 of FIG. 1.

FIG. 4 is a sectional view taken along line 4—4 of FIG. 3.

FIG. 5 is a sectional view taken along line 5—5 of FIG. 3.

FIG. 6 is an enlarged partial view similar to FIG. 4 showing the various positions to which the wear plates may be moved.

FIG. 7 is an enlarged partial plan view showing one of the notches in the wear plates.

DETAILED DESCRIPTION OF THE INVENTION

Referring to the drawings, the numeral 10 generally designates a tractor having a backfiller assembly 12 mounted at the forward end thereof. Assembly 12 is supported by a pair of lift arms 14 which extend forwardly from the tractor and which are connected at their forward ends to a blade frame 16, having an arcuate blade 18 thereon. An extensible link 20 is secured at one of its ends to arms 14 and at the other of its ends to blade frame 16, so as to permit the selective adjustment of the attitude of blade 16 with respect to the ground. A lift cylinder 22 is connected at one of its ends to tractor 10 and at the other of its ends to blade frame 16. so as to permit the lifting and lowering of blade frame 16 with respect to the ground.

Rigidly secured to blade frame 16 at the opposite ends thereof and extending forwardly therefrom are a pair of support arms 24, 26. Extending between the lower ends of support arms 24, 26 and rotatably journaled therein is an auger 28 comprising an auger shaft 30, a helical flighting 32, a helical ribbon flange 34 adjacent the outer peripheral edge of flighting 32, and a plurality of wear plates 36 positioned adjacent the outer edge of flighting 32.

Mounted on the upper portion of blade frame 16 is an engine 38 which is connected by various drive trains (not shown) to auger shaft 30 for rotating the auger. Various drive connections could be used without detracting from the invention, but an example of such a system is the use of a plurality of bearings and chains interconnecting the output shaft of engine 38 and the auger shaft 30.

Each wear plate 36 comprises an inner arcuate edge 40, an outer arcuate edge 42, and opposite end edges 44, 46. Outer edge 42 has a curvature which conforms substantially to the curvature of the outer edge 48 of the auger flighting 32. Inner arcuate edge 40 includes a pair of radially outwardly extending slots 50 located adjacent each of its opposite ends 44, 46. Each slot 50 includes an elongated central portion 52 which terminates in an outer radial end 54. The opposite lateral edges of elongated portion 52 are provided with a plurality of notches 56 which are spaced apart from one another. The notches 56 on one side of slot 50 are alternatively positioned with respect to the notches 56 on the opposite side of slot 50.

Adjacent the outer peripheral edge of auger flighting 32 are a plurality of spaced apart bolt holes 58 each of which carries a bolt 60 having a bolt head 62 at one end and a threaded nut 64 at the other end. The distance between bolts 60 is equal to the distance between slots 50 in wear plates 36. Bolts 60 are sized to slide freely along the length of slot 50 and to fit retentively within any one of notches 56. Referring to FIG. 2, each notch 56 includes a radially outwardly presented face 66 and a radially inwardly presented face 68. These faces 66, 68 engage bolt 60 and prevent bolt 60 from sliding longitudinally within slot 50. When nut 64 is tightened, bolt 60 is firmly secured within notch 56 so as to prevent wear plate 36 from sliding or moving with respect to flighting 32. As shown in FIG. 5, plate 36 is secured in place so that its outer arcuate edge 42 protrudes a short distance beyond the outer arcuate edge 48 of flighting 32. As plates 36 wear down, nuts 64 are loosened and the plates are moved radially outwardly so that they will always protrude beyond the outer edge 48 of flighting 32. FIG. 6 shows the various positions to which wear plates 36 may be moved.

The present invention permits the wear plates to be adjusted radially with a minimum of time and effort. All that is necessary is to loosen nut 64, move plates 36 to the desired radial position, fit bolts 60 within the notches 56 at the desired position, and retighten bolt 64. Because the bolts are engaged by the inner and outer radially positioned faces 66, 68 of notches 56, they are held against movement and do not require further securing means to hold them in place.

Thus, it can be seen that the device accomplishes at least all of its stated objectives.

What is claimed is:

1. An improvement for a backfilling machine having an auger, said auger having a central shaft and a helical flighting thereon, said flighting having an inner radial edge attached to said central shaft and an outer radial edge, said backfilling machine having a frame, wheels, power means for moving said wheels, lift arms attached to said auger for raising and lowering said auger with respect to the ground, and auger power means connected to said auger for rotating same, said improvement comprising:

a plurality of wear plates mounted to said flighting along said outer radial edge thereof;

each of said wear plates having opposite ends, a concave arcuate edge and having a curvature approximately the same as the curvature of said outer radial edge of said flighting;

adjustable securing means attaching said wear plates to said flighting in end to end relation adjacent said outer radial edge of said flighting with said convex edges of said plates protruding radially beyond said outer radial edge of said flighting in approximate concentric orientation therewith;

said adjustable securing means each comprising at least two bolt holes in said flighting, tightenable bolt means extending through each of said bolt holes, at least two slots extending radially with respect to said auger shaft into said plate from said inner arcuate edge toward said outer arcuate edge;

each of said slots being elongated and including opposite side margins and an outer end margin, said notches being provided along said side margins in spaced apart relation, each of said notches having opposite side edges, one of which faces radially inwardly toward said central auger shaft and one of which faces radially outwardly away from said auger shaft whereby said opposite side edges of said notch engage said bolt means to limit inner and outer radial movement of said plate; and one of said slots in said wear plate being located adjacent one of said opposite ends thereof and the other of said slots being adjacent the other of said opposite ends of said wear plate.

* * * * *